July 30, 1935. W. MATHIESEN 2,009,555
MEANS OF CHANGING THE CONDITION AND THE ACTINIC
QUALITIES OF OPEN ELECTRIC ARC LIGHTS
Filed March 24, 1928
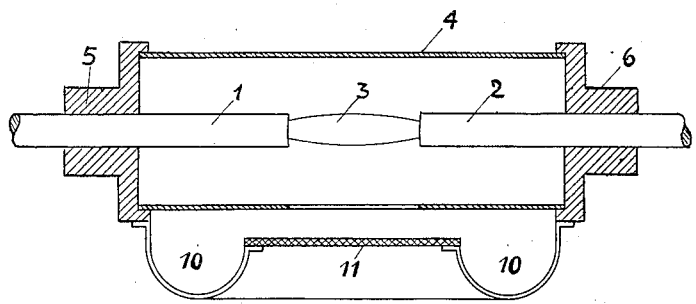
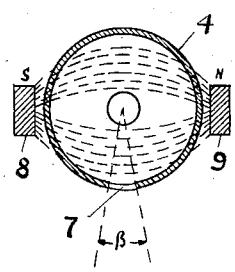
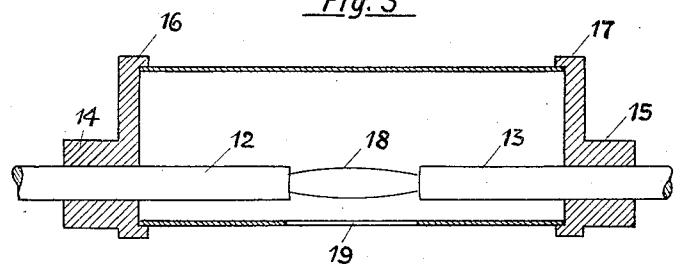
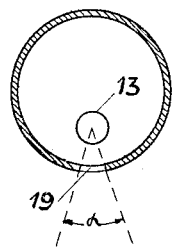
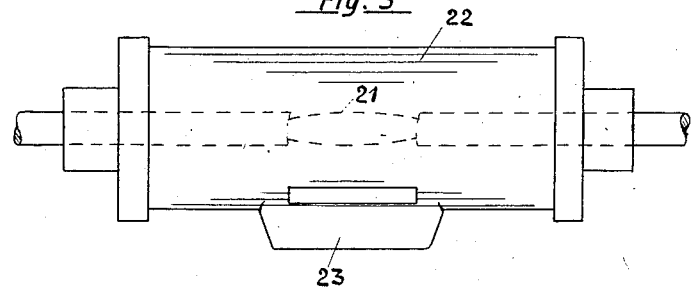
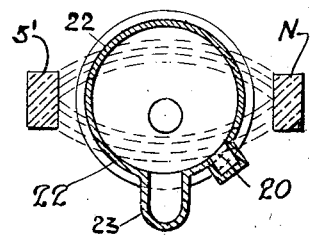
Inventor:
Wilhelm Mathiesen.

UNITED STATES PATENT OFFICE 2,009,555

MEANS OF CHANGING THE CONDITION AND THE ACTINIC QUALITIES OF OPEN ELECTRIC ARC LIGHTS

Wilhelm Mathiesen, Leipzig, Germany

Application March 24, 1928, Serial No. 264,469
In Germany March 29, 1927

5 Claims. (Cl. 176—117)

This invention has reference to means of changing the condition and the actinic qualities of open electric arc lights and it is intended to substantially impart thereto most of the valuable qualities of the arc light burning in closed spaces. It is well known that the electric arc light burning in a closed space, within a globe for instance, is distinguished from the open burning arcs by the fact that it is not surrounded by a halo or exterior mantle which in the case of the open burning arc absorbs a large quantity of the rays emitted by the bluish nucleus of the flame. This difference is probably accounted for by the fact that with the arc burning in a closed space there is a certain deficiency of oxygen or of air, and the lighting effect of the closed arc is therefore very different from that of the open burning arc light. It is well known that an arc light burning in a closed space emits a considerably larger quantity of short-waved rays of high actinic and therapeutic efficiencies than the open burning arc light in view of the fact that the absorbing halo is missing in the case of the closed arc light. There is, however, the difficulty as regards the utilization of the highly efficient, short-waved rays of the closed arc that in the latter case the rays are compelled to pass through a transparent wall of glass, quartz, or of similar material and provided on the particular enclosure for the flame, so that a very considerable part of the rays are absorbed and retained thereby. Without the use of such an enclosure, however, the arc of light loses its valuable actinic and therapeutic efficiencies on account of the unrestrained admission of oxygen or of air and in view of the halo or mantle around the flame thereby produced, so that it becomes an ordinary open burning arc light.

Now, this invention has for one of its important objects to provide means in connection with electric arc lights of retaining the valuable properties of the arc light burning in a closed space, though the arc is allowed to freely emit its rays and without being interfered with by the walls of an enclosure. In accordance with this invention the arrangement is such that in a vessel or enclosure of any suitable shape and size surrounding the arc light one or, under certain conditions, a plurality of openings are disposed so as to admit of the free emission of the rays through them, without, however, allowing the entrance of the air, or providing merely for a minimum of exchange of outside air. By surrounding for instance, the arc light struck between horizontally disposed electrodes with a metal cylinder provided with slots at its lower side the rays of the arc light are free to be discharged through this slot while the upward movement of the air caused by the high temperature in the interior of the enclosure will prevent the admission of outside air through the slot, so that the properties of the closed arc light are maintained.

It has been ascertained in this connection that even in the case of inclined electrodes the exchange of air from the outside to the inside remains so low that the arc is not essentially modified. Nor is it absolutely necessary that the openings should be disposed vertically underneath the arc light. They may also be disposed laterally and at any desired angle with relation to the arc light and even in the horizontal plane of the same. In the case of laterally disposed openings there is the advantage that any particles dropping down from the burning electrodes are prevented from being discharged directly through the openings. It has been found to be of advantage that the danger of the dropping out of highly incandescent particles of electrodes should be prevented still more efficiently by means of enlargements or other configurations of the enclosure surrounding the arc. In accordance with another modification of the invention filters, sieves, strainers, plates of quartz, glass or the like may be spacedly disposed in front of the openings of the enclosure without thereby deviating from the spirit of the invention.

In order to increase the angle of emission the arc may be disposed so as to be as near as possible to the openings. For the purpose of regulating the direction of the arc I may use fields of blowing magnets or the like in the usual manner. In accordance with another modification a reflector may be provided in the interior of the enclosure or a part of the enclosure or vessel may be shaped so as to constitute a reflector itself. The particular shape, size and nature of the material of the enclosure surrounding the arc light is immaterial in accordance with the invention. Cylindrical, globular, prismatic or other shapes may be employed and the vessel or enclosure may be made of sheet metal, glass, quartz, red bronze and of equivalent material.

The invention will be further described by reference to the accompanying drawing showing by way of exemplification different forms of embodiment of the principles of this invention. In the drawing Figs. 1 and 2 are illustrations of an embodiment shown respectively in vertical longitudinal section and in cross section. Figs. 3 and 4 represent a modified construction substantially corresponding to the embodiment of Figs. 1 and 2 with the provision, however, that the electrodes are eccentrically disposed. In Figs. 5 and 6 I have shown another modification in side elevation and vertical cross section respectively, having means for the angular emission of the rays. The means of adjustment of the carbons and the regulating and controlling instrumentalities are not shown in the drawing, as they are not necessary for the understanding of the invention.

The arc of light 3 which is formed between two horizontally disposed electrodes 1 and 2 according to Figs. 1 and 2 of the drawing is surrounded by a cylindrical casing comprising a shade 4 of sheet metal which, together with two electrically insulated heads 5 and 6 which may serve as guides for the carbon electrodes, encloses the burning space of the lamp. Substantially vertically underneath the arc of light 3 the metal shade 4 is provided having a comparatively narrow slot 7 constituting the opening for the discharge of the rays. On both sides of the arc of light 3 two blowing magnets 8 and 9 are arranged adapted to direct the arc so as to be approximately concentric to the position of the electrodes and counteracting the upwardly moving tendency of the arc. In Fig. 1 the blowing magnets 8 and 9 have been omitted for the sake of clearness of illustration.

The mode of operation of the arrangement described is substantially as follows: The high temperature generated by the arc of light 3 in the interior of the enclosure causes the air to ascend. Now, if the vessel or enclosure is comparatively tightly closed no air will be admitted through the slots 7 provided in the lower part of the metal shade. There will therefore be no occasion of a compensation or equalization of the air inside and outside and the arc of light will therefore retain the properties of an arc burning in a closed space, though the rays can freely escape through the slot 7. It will be observed that the casing has considerable capacity between its walls and the electrodes to contain the heated gases.

It will frequently be necessary to provide for preventing the escape of glowing particles of electrodes which are thrown off from the burning carbons and with this end in view I may provide a catching instrumentality or vessel 10 facing the escape opening 7. For the same purpose a filter 11 adapted for the end in view may also be arranged in the vicinity of the opening in any suitable manner. In Fig. 2 of the drawing the catching basin 10 and the filter 11 have been omitted for the sake of clearness of illustration.

In Figs. 3 and 4 the openings 14 and 15 for the guiding of the carbon rods 12 and 13 are eccentrically disposed in the two flanges 16 and 17 so that the arc of light 18 is arranged closely above the opening 19 for the escape of the rays and arranged substantially in the same manner as described with reference to Figs. 1 and 2. It appears from Fig. 4, that by means of the eccentric arrangement of the carbons the angle of emission of the rays has become considerably increased as compared with the angle shown in Fig. 2 in connection with the centric arrangement of the carbons. If desired, the bearings of the electrodes may also be adjustably disposed.

In a modification of the invention according to Figs. 5 and 6 the escape opening 20 is laterally arranged in the shade 22 surrounding the arc 21, so that dropping down particles of electrodes will be prevented from falling directly to the outside. With the view of assisting this action of the laterally disposed opening 20 a pocket 23 is provided in the shade 22 underneath the arc 21, this pocket being intended for the reception of the dropping down particles of electrodes. This pocket may preferably be provided with a well closing door or lid, in order to be able to readily remove the accumulated particles.

It should also be noted that a part of the wall of the shade, particularly that opposite the flame, may serve as a reflector and in accordance with another arrangement a separate reflector may be provided in the interior of the shade or other enclosure.

The invention is susceptible of other modifications and changes besides described by way of exemplification only, and without thereby deviating from the scope and spirit of the invention as expressed in the appended claims.

I claim:

1. In a device of the kind described an enclosure, oppositely and confrontingly and spacedly disposed electrodes adapted to strike an arc between the confronting ends thereof, a depressed substantially pocket-like part on the enclosure below the arc and substantially in the vertical plane of the electrodes and an apertured portion on the enclosure opposite the electrodes and adjacent the depressed portion.

2. In a device of the kind described in combination, a substantially horizontally disposed substantially cylindrical enclosure, oppositely and confrontingly and spacedly disposed adjustable electrodes within said enclosure adapted to strike an arc between the confronting ends thereof, an apertured portion in the lower part of the enclosure opposite the arc, catching means for the waste electrode-particles near said apertured portion and magnetic, arc-directing means associated with the electrodes and adapted to counteract the ascending tendency of the arc.

3. In an arc lamp for radiation purposes, the combination of a cylindrical casing including a metallic peripheral wall and opposite insulating heads having alined bearings, with opposite electrodes respectively mounted in said bearings to provide an electric arc within the casing, said casing having its peripheral wall spaced from the electrodes to provide a practically closed chamber of large capacity to hold the heated gases around the electrodes, and said casing having in its lower peripheral wall a narrow longitudinal slot open to the atmosphere at all times opposite to and approximately coextensive with the arcing gap between the electrodes for the emission of radiation from the chamber.

4. In an arc lamp for radiation purposes, the combination of a cylindrical casing, a metallic peripheral wall and opposite insulating heads having alined bearings eccentric to the axis of the casing, with opposite electrodes respectively mounted in the alined bearings to provide an electric arc within the casing offset from the axis of the casing, said casing having in that part of its peripheral wall nearest the electrodes a narrow longitudinal slot open to the atmosphere at all times approximately coextensive with the arcing gap between the electrodes.

5. In an arc lamp for radiation purposes the combination of a casing including opposite insulating heads having alined bearings, with opposite electrodes respectively mounted in said bearings to provide an electric arc within the casing, said casing having its perimeter spaced from the electrodes to provide a practically closed chamber of large capacity to hold the heated gases around the electrodes, and said casing having in its lower perimeter a narrow slot open to the atmosphere at all times opposite to and approximately coextensive with the arcing gap between the electrodes for the emission of radiation from the chamber.

WILHELM MATHIESEN.